(12) United States Patent
Chan et al.

(10) Patent No.: US 9,269,024 B2
(45) Date of Patent: Feb. 23, 2016

(54) IMAGE RECOGNITION SYSTEM BASED ON CASCADED OVER-COMPLETE DICTIONARIES

(75) Inventors: Victor H. Chan, San Diego, CA (US);
Thomas Zheng, San Diego, CA (US);
Yinyin Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 13/018,409

(22) Filed: Jan. 31, 2011

(65) Prior Publication Data
US 2011/0188757 A1    Aug. 4, 2011

Related U.S. Application Data

(60) Provisional application No. 61/300,408, filed on Feb. 1, 2010.

(51) Int. Cl.
*G06K 9/46* (2006.01)
*G06K 9/62* (2006.01)

(52) U.S. Cl.
CPC ................................ *G06K 9/6232* (2013.01)

(58) Field of Classification Search
CPC ... G06K 9/00906; G06K 9/03; G06K 9/2054; G06K 9/3208; G06K 9/3258; G06K 9/3283; G06K 9/34; G06K 9/342; G06K 9/46; G06K 9/4628; G06K 9/4638; G06K 9/4652; G06K 9/4671; G06K 9/6203; G06K 9/62; G06K 9/00221; G06K 9/00711; G06K 9/6201; G06K 9/6267; G06F 17/30247; G06F 17/30787; G06F 17/30799

USPC .......................... 382/181, 187, 186, 190, 170
See application file for complete search history.

(56) References Cited

U.S. PATENT DOCUMENTS 5,917,944 A  *  6/1999  Wakisaka et al. ............. 382/190
6,415,256 B1 *  7/2002  Ditzik ........................... 704/231
(Continued)

FOREIGN PATENT DOCUMENTS

CN        1672357 A      9/2005
EP        0933943 A2     8/1999
(Continued)

OTHER PUBLICATIONS

Engan et al., "Frame Texture Classification Method (FTCM) Applied to Mammograms for Detection of Abnormalities". Waset International Journal of Signal Processing, [Online] vol. 4, No. 2, 2008, pp. 122-132, XP002632943, ISSN: 1304-4478 Retrieved from the Internet: URL:http://www.akademik.unsri.ac.id/downioad/journal/files/waset/v4-2-16-7.pdf, [retrieved on Apr. 14, 2011].
(Continued)

*Primary Examiner* — Manuchehr Rahmjoo
(74) *Attorney, Agent, or Firm* — James T. Hagler; Scott A. Barker

(57) ABSTRACT

Certain embodiments of the present disclosure relate to a technique for image reconstruction that employs cascaded over-complete dictionaries (i.e., collections of bases) for extracting features and building representations for images at different reconstruction levels. Each dictionary on a different reconstruction level can be learned and optimized for the purpose of capturing either generic or discriminative features. By finding sparse representations through the cascaded dictionaries, an image can be reconstructed and recognized.

13 Claims, 4 Drawing Sheets

(56) References Cited

U.S. PATENT DOCUMENTS

| | | | |
|---|---|---|---|
| 2005/0175235 A1* | 8/2005 | Luo et al. | 382/159 |
| 2006/0013445 A1 | 1/2006 | Lange | |
| 2008/0058593 A1* | 3/2008 | Gu et al. | 600/109 |
| 2009/0010500 A1 | 1/2009 | Kandaswamy et al. | |
| 2011/0172514 A1* | 7/2011 | Lee et al. | 600/408 |

FOREIGN PATENT DOCUMENTS

| | | |
|---|---|---|
| JP | S58189700 A | 11/1983 |
| JP | 2000004166 A | 1/2000 |
| JP | 2005534378 A | 11/2005 |
| WO | WO-2004012388 A1 | 2/2004 |

OTHER PUBLICATIONS

International Search Report and Written Opinion—PCT/US2011/023326, ISA/EPO—Apr. 28, 2011.

Meyer et al., "Chapter 10. Multi-layered image representation" In : "Wavelets in Signal and Image Analysis", 2001, Kluwer Academic Publishers, XP002632944, pp. 281-303.

Monaci G., et al., "Learning Structured Dictionaries for Image Representation", Image Processing, 2004 ICIP '04, 2004 International Conference on Singapore Oct. 24-27, 2004, Piscataway, NJ, USA, IEEE, vol. 4, pp. 2351-2354, XP010786258, DOI: 10.1109/ICIP.2004.1421572, ISBN: 978-0-7803-8554-2.

* cited by examiner

IMAGE RECOGNITION SYSTEM BASED ON CASCADED OVER-COMPLETE DICTIONARIES

CLAIM OF PRIORITY UNDER 35 U.S.C. §119

The present Application for Patent claims priority to U.S. Provisional Application No. 61/300,408, entitled, "IMAGE RECOGNITION SYSTEM AND METHOD BASED ON CASCADED OVER-COMPLETE DICTIONARIES," filed Feb. 1, 2010, and assigned to the assignee hereof and expressly incorporated herein by reference.

TECHNICAL FIELD

The present disclosure generally relates to signal processing and, more particularly, to a method for image recognition based on cascaded collections of basis for extracting features and building representations of images at different reconstruction levels.

BACKGROUND

In image recognition, an over-complete dictionary as a collection of bases can be utilized to represent and reconstruct images. The dictionary can be optimized to include a large set of bases, but typically uses only a small group of bases to reconstruct a particular image. Therefore, the representation is generally sparse. To classify an image, it is desirable for the dictionary to contain discriminative features from different classes so that the sparse representation would indicate class labels.

However, the image can typically comprise both generic features and class-specific features. Therefore, for an image recognition system that is based on a recognition by reconstruction scheme, it is desirable that the dictionary possesses not only discriminative power for classification purpose, but also reconstructive power for error tolerance.

SUMMARY

Certain embodiments of the present disclosure provide a method for signal processing. The method generally includes obtaining one or more signals related to one or more subjects or categories, constructing one or more generic features of the subjects based on the signals, extracting and removing the generic features from the signals to obtain one or more updated patterns for each subject, obtaining a set of discriminative features for each subject based on the updated patterns, and recognizing the updated patterns using only discriminative features.

Certain embodiments of the present disclosure provide a method for signal processing. The method generally includes obtaining an image related to a subject of a plurality of subjects, reconstructing one or more generic features of the image based on a generic dictionary, the generic dictionary comprising generic information of all the subjects or categories, and reconstructing the image with generic features reconstructed and removed to recognize the subject using a discriminative dictionary, the discriminative dictionary comprising one or more sets of discriminative features, each set is associated with a different subject of the plurality of subjects.

Certain embodiments of the present disclosure provide an apparatus for signal processing. The apparatus generally includes means for obtaining one or more signals related to one or more subjects or categories, means for constructing one or more generic features of the subjects based on the signals, means for extracting and removing the generic features from the signals to obtain one or more updated patterns for each subject, means for obtaining a set of discriminative features for each subject based on the updated patterns, and means for recognizing the updated patterns using only discriminative features.

Certain embodiments of the present disclosure provide an apparatus for signal processing. The apparatus generally includes means for obtaining an image related to a subject of a plurality of subjects, means for reconstructing one or more generic features of the image based on a generic dictionary, the generic dictionary comprising generic information of all the subjects or categories, and means for reconstructing the image with generic features reconstructed and removed to recognize the subject using a discriminative dictionary, the discriminative dictionary comprising one or more sets of discriminative features, each set is associated with a different subject of the plurality of subjects.

Certain embodiments of the present disclosure provide an apparatus for signal processing. The apparatus generally includes at least one processor configured to obtain one or more signals related to one or more subjects or categories, construct one or more generic features of the subjects based on the signals, extract and remove the generic features from the signals to obtain one or more updated patterns for each subject, obtain a set of discriminative features for each subject based on the updated patterns, and recognize the updated patterns using only discriminative features.

Certain embodiments of the present disclosure provide an apparatus for signal processing. The apparatus generally at least one processor configured to obtain an image related to a subject of a plurality of subjects, reconstruct one or more generic features of the image based on a generic dictionary, the generic dictionary comprising generic information of all the subjects or categories, and reconstruct the image with generic features reconstructed and removed to recognize the subject using a discriminative dictionary, the discriminative dictionary comprising one or more sets of discriminative features, each set is associated with a different subject of the plurality of subjects.

Certain embodiments of the present disclosure provide a computer program product comprising a computer-readable storage medium having instruction stored thereon. The instructions are generally executable by a processor for obtaining one or more signals related to one or more subjects or categories, constructing one or more generic features of the subjects based on the signals, extracting and removing the generic features from the signals to obtain one or more updated patterns for each subject, obtaining a set of discriminative features for each subject based on the updated patterns, and recognizing the updated patterns using only discriminative features.

Certain embodiments of the present disclosure provide a computer program product comprising a computer-readable storage medium having instruction stored thereon. The instructions are generally executable by a processor for obtaining an image related to a subject of a plurality of subjects, reconstructing one or more generic features of the image based on a generic dictionary, the generic dictionary comprising generic information of all the subjects or categories, and reconstructing the image with generic features reconstructed and removed to recognize the subject using a discriminative dictionary, the discriminative dictionary comprising one or more sets of discriminative features, each set is associated with a different subject of the plurality of subjects.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Various embodiments of the disclosure are described below. It should be apparent that the teachings herein may be embodied in a wide variety of forms and that any specific structure, function, or both, being disclosed herein is merely representative.

Based on the teachings herein, one skilled in the art should appreciate that an embodiment disclosed herein may be implemented independently of any other embodiments and that two or more of these embodiments may be combined in various ways. For example, an apparatus may be implemented or a method may be practiced using any number of the embodiments set forth herein. In addition, such an apparatus may be implemented or such a method may be practiced using other structure, functionality, or structure and functionality in addition to or other than one or more of the embodiments set forth herein. Furthermore, an embodiment may comprise at least one element of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different wireless technologies, system configurations, networks and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

An Example Pattern Recognition System

The techniques described herein relate to signal processing, and, more particularly, to processing of a pattern which is related to a subject that needs to be recognized.

Figure 1:
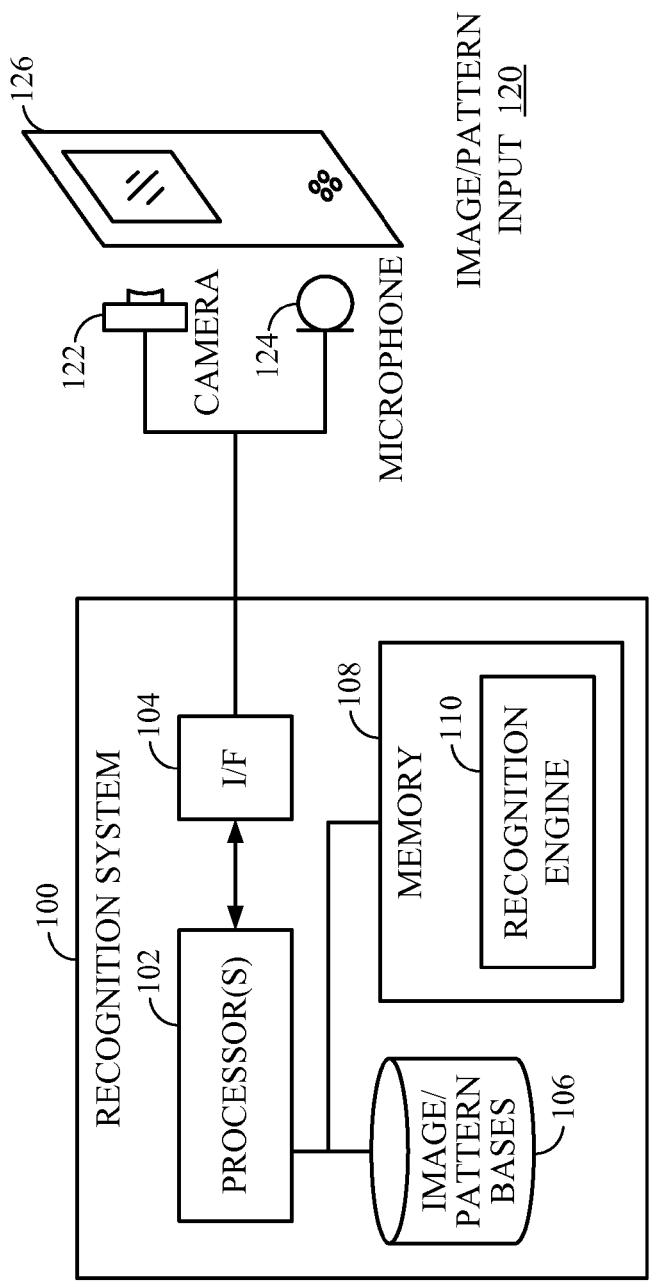
FIG. 1 illustrates a system for pattern recognition in which certain embodiments of the present disclosure may be practiced.

FIG. 1 illustrates an example system 100 for pattern recognition in which embodiments of the present disclosure may be practiced. The pattern recognition system 100 may be used to recognize different patterns or signals, such as images for subject recognition or audio signals for voice recognition.

The system 100 may be utilized in a wide range of applications, including security application (e.g., in airports and office buildings), and may be implemented on a wide range of different type platforms, such as a desktop, a laptop computer, or a handheld device (e.g., a mobile phone).

According to certain embodiments of the present disclosure, an input platform 120 may include a screening station 126, through which a camera 122 may provide signals corresponding to an image of a subject and/or a microphone 124 that may provide signals corresponding to a human's voice. The screening station 126, for example, may be positioned at a security checkpoint, such as those found in airports or building entrances. While the platform 120 is shown with both the camera 122 and microphone 124, according to certain embodiments only one of such devices may be included. Further, additional or alternative devices may also be used, such as a fingerprint reader, iris reader, or the like. Whatever devices or combination of devices are used, the pattern recognition system 100 may be configured to identify a pattern based on the received signals.

The pattern recognition system 100 may include an interface 104 to receive and process the input signals. The interface 104 may include any suitable circuitry, such as amplifiers, filters, analog-to-digital (A/D) converters and the like, to provide a suitable pattern signal for one or more processors 102. The processor(s) 102 may process the input pattern signal according to some recognition algorithm initiated for execution by a recognition engine 110 within the memory 108. The pattern recognition may be achieved, for example, by matching the input pattern signal (e.g., the image or voice) with available pattern bases 106 associated with a plurality of subjects.

Figure 2:
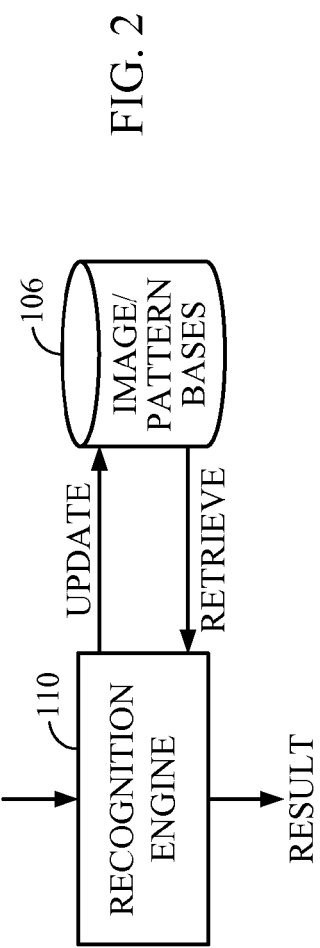
FIG. 2 illustrates an example of a pattern recognition engine interfaced with pattern bases in accordance with certain embodiments of the present disclosure.

As illustrated in FIG. 2, the recognition engine 110 may interface with the pattern bases 106. For example, the recognition engine 110 may generate and update the pattern bases 106 during training operations. The pattern bases may be accessed to perform recognition operations. In other words, an input pattern (e.g., the image or voice) may be processed for subject recognition according to the recognition algorithm run by the recognition engine 110 by using one or more pattern bases retrieved from the pool of pattern bases 106. Furthermore, pattern bases related to the existing subjects may be periodically updated during the training process, and one or more pattern bases associated with one or more new subjects may be also added in the pool of pattern bases 106.

Cascaded Dictionaries for Sparse Representation and Classification

An over-complete dictionary as a collection of pattern bases may be utilized in the pattern recognition system 100 in order to represent and reconstruct images. In certain embodiments of the present disclosure, dictionaries may be applied on different levels of image reconstruction. Each dictionary on a particular level may be learned and optimized for the purpose of capturing either generic or discriminative features. By finding sparse representations through the cascaded dictionaries for different levels of reconstruction, the image may be reconstructed and recognized.

It should be noted that dictionaries at lower levels of reconstruction may be employed to reconstruct more generic features, while higher level dictionaries may be dedicated to more discriminative features. Also, the sparseness of representation using a discriminative dictionary on the top reconstruction level may be increased by adding one or more cascaded dictionaries at lower reconstruction levels in order to improve classification performance.

In the image recognition system with cascaded dictionaries, reconstructing the generic (i.e., class-irrelevant) and discriminative (i.e., class-relevant) information may be separated. Each dictionary on a different level of reconstruction may be learned and optimized separately for the purpose of capturing either generic or discriminative features. On the lowest level of reconstruction, the dictionary may capture statistics of images from all supported classes. The bases that may be developed through dictionary update may accordingly represent the common features across all the classes. Such dictionary with generic features at a particular lower reconstruction level may be able to reconstruct an image from any class up to the same degree. The remaining signal, as the input image subtracted by the reconstructed signal from this dictionary, may remain to be reconstructed by dictionaries on later higher reconstruction stages.

On the highest level of image reconstruction, all generic features may be extracted and subtracted from the input image. The remaining signals may be used to construct a dictionary with class-specific discriminative features. The dictionary on this level may comprise subspaces corresponding to different classes. A subspace may capture the statistics of images from one single class, and the bases in the subspace may represent the features that differentiate them from the rest of image classes. In this way, one subspace may be better than other subspaces when constructed images are from the class that the subspace represents. Therefore, the solution when using this dictionary may be sparse.

Different reconstruction levels from different subspaces may indicate which class a particular image that is being reconstructed belongs to. Depending on the complexity of images and difficulty of classification, one or more dictionaries may be added in middle levels of reconstruction where they may represent less generic but more discriminative features in order to increase sparseness of the representation on the top reconstruction level.

Figure 3:
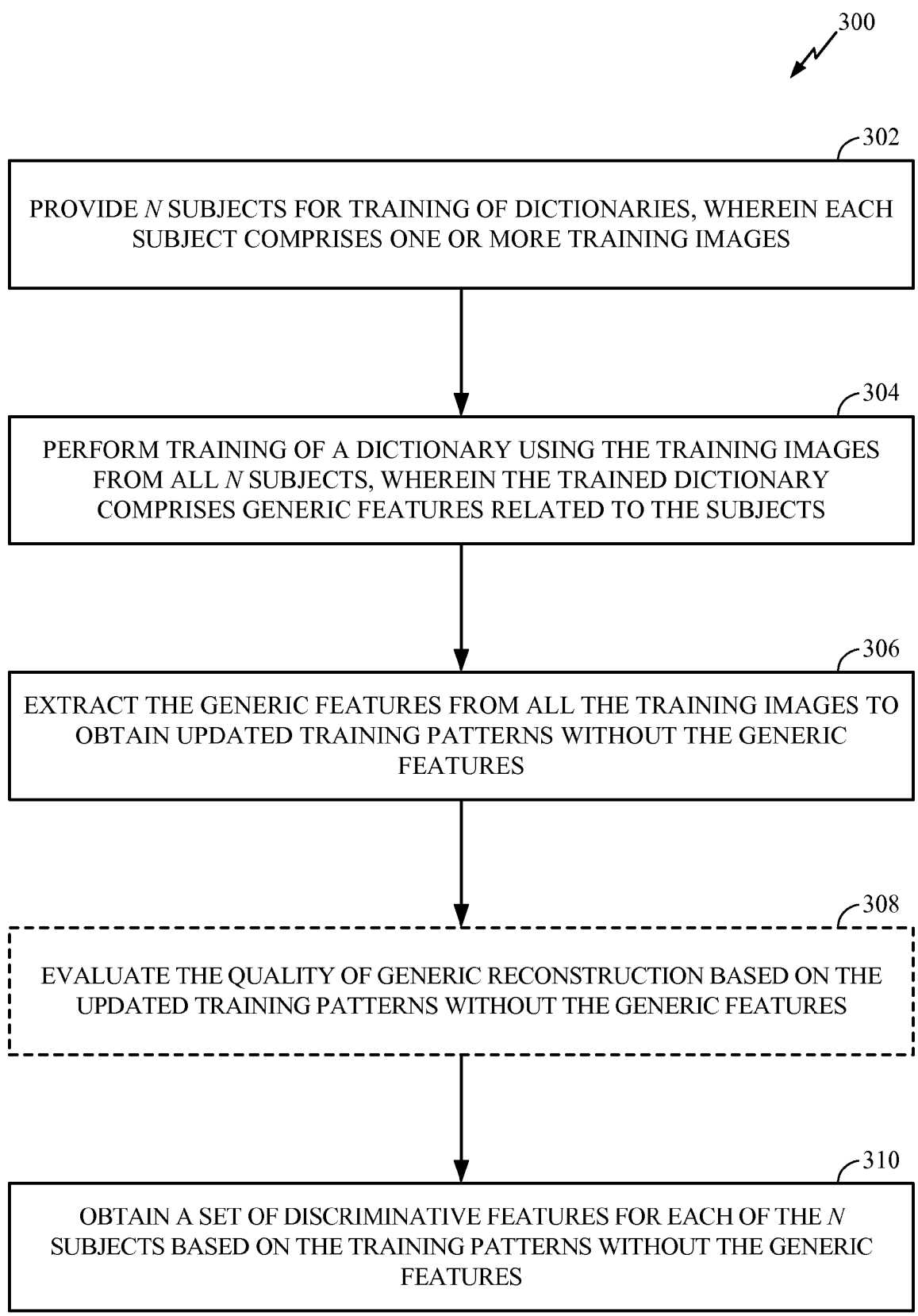
FIG. 3 illustrates example operations for training of dictionaries as collections of bases to be utilized for image reconstruction in accordance with certain embodiments of the present disclosure.

FIG. 3 illustrates example operations 300 for training of cascaded dictionaries as collections of bases to be used for image reconstruction and subject recognition in accordance with certain embodiments of the present disclosure. At 302, N subjects may be provided for training of dictionaries, wherein each subject may comprise one or more training images. At 304, a dictionary may be trained using the training images from all N subjects. The trained dictionary may comprise a set of most generic features related to all the subjects, and it may be used as a generic dictionary associated with an initial level of image reconstruction. After that, at 306, reconstructed images obtained using the set of generic features may be subtracted from all the input images to obtain updated training patterns without these generic features.

The remaining images with generic features reconstructed and removed may be optionally used, at 308, to evaluate the quality of the generic reconstruction. If the quality is not satisfactory, then one or more cascaded generic dictionaries may be further constructed. Therefore, if the quality is not satisfactory, the operations 304-306 may be optionally repeated a plurality of times to obtain cascaded generic dictionaries, one generic dictionary for a different level of image reconstruction. Features that would be constructed at 304 based on the patterns without previously found generic features may be less generic for every next higher reconstruction level. Therefore, a corresponding trained dictionary may comprise less generic and more discriminative features for every next higher reconstruction level. After extracting at 306 all remaining generic features from the input images, training of one or more discriminative dictionaries related to discriminative features of the subjects may follow.

At this point, input patterns for each subject may only comprise discriminative features of the corresponding original input images. At 310, a set of discriminative features may be obtained for each of the N subjects based on the input patterns without the generic features, which may result into a discriminative dictionary with N sub-dictionaries, each sub-dictionary may be associated with a different subject.

In the testing stage, an image may be firstly processed and reconstructed by the lower level of dictionaries. The remaining signal may be reconstructed by the top level discriminative and class-relevant dictionary. The subject may be recognized by finding which sub-dictionary is the best for reconstructing the input signal.

This discriminative dictionary may correspond to the highest reconstruction level, and it may comprise the most discriminative features related to the N subjects. Depending on the complexity of images and difficulty of their classification, one or more dictionaries with less discriminative features may be trained and included in image reconstruction before applying the dictionary with the most discriminative features.

Figure 4:
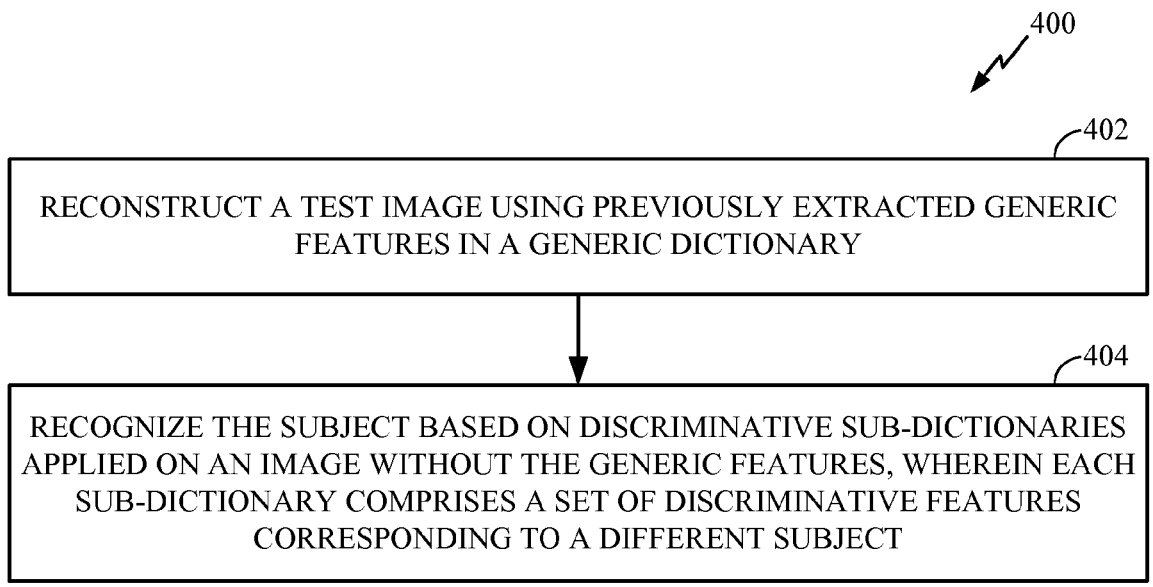
FIG. 4 illustrates example operations for image reconstruction and recognition based on the trained cascaded dictionaries in accordance with certain embodiments of the present disclosure.

FIG. 4 illustrates example operations 400 for reconstruction of an image related to a subject based on the previously trained cascaded dictionaries (i.e., collections of bases at different reconstruction levels) in accordance with certain embodiments of the present disclosure. At 402, reconstruction of a test image may be performed firstly using the previously extracted generic features in the generic dictionary.

At 404, reconstruction of the image and recognition of the subject may be performed based on N previously trained discriminative sub-dictionaries (i.e., sets of discriminative features) applied on the image with the generic features removed, wherein each sub-dictionary may correspond to one possible subject to be recognized. All the sub-dictionaries may be part of the trained discriminative dictionary that may be associated with the highest level of image reconstruction. As mentioned above, depending on the complexity of image and difficulty of its classification, one or more dictionaries with less discriminative features may be employed before applying the dictionary with the most discriminative features in order to increase sparseness of the representation on the top reconstruction level.

The proposed image classifier based on the reconstructive technique can be compared against the existing discriminant classifier from the art, when both techniques are applied for the same pattern recognition. On one hand, the present learning theory supports the use of discriminant classifier, namely the large-margin classifiers such as Support Vector Machines (SVM). Also, there exists more rigorous understanding of the generalization errors of these classifiers. On the other hand, there are certain advantages in using the proposed reconstructive models for pattern recognition, such as scalability and error tolerance. By using a small number of bases to represent a whole image, the proposed technique may achieve favorable scalability in the number of classes and number of training samples per class. Furthermore, many errors observed in the pattern recognition can be modeled as additive errors. These errors may be readily removed or corrected in the proposed reconstructive model.

Figure 3A:
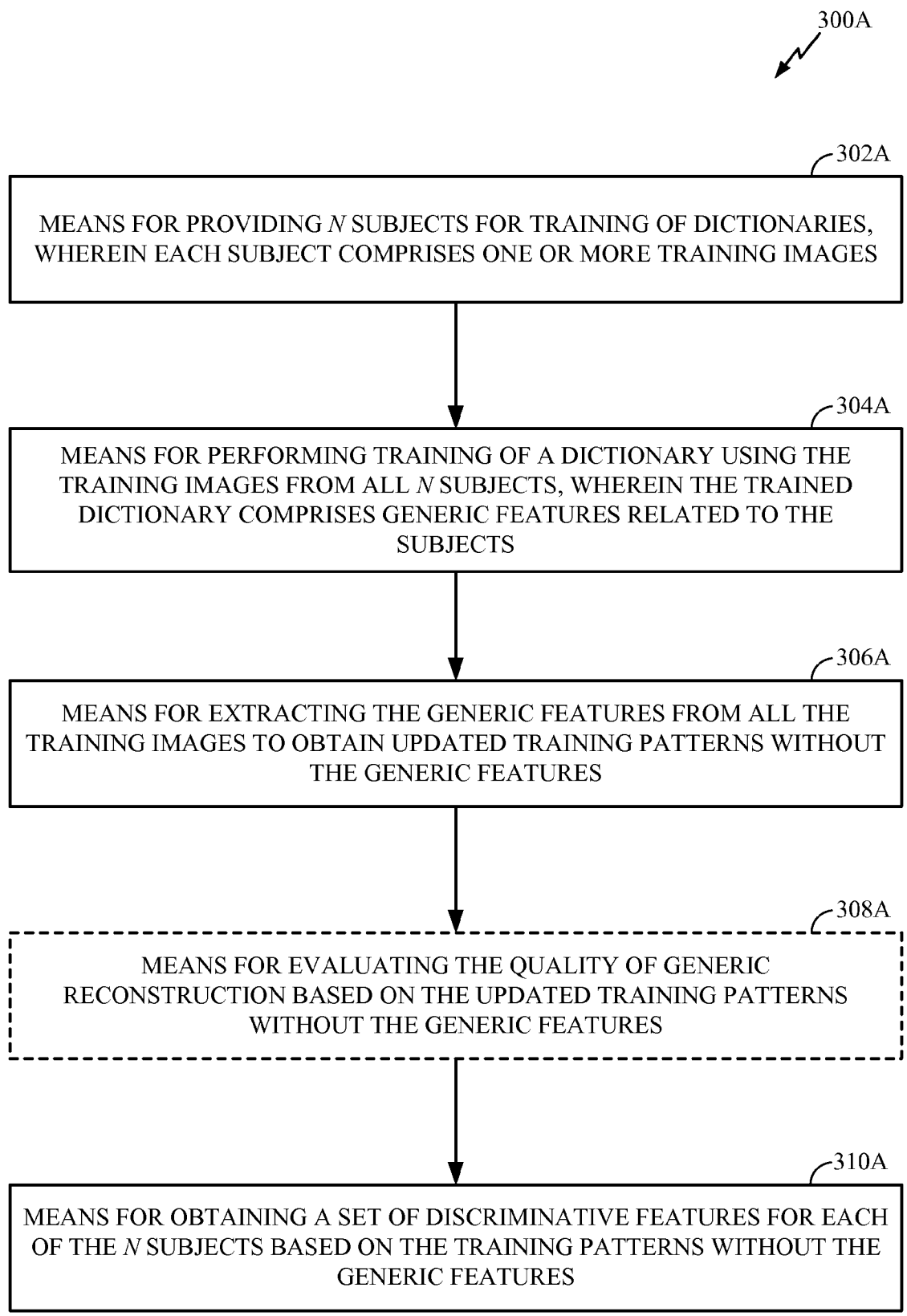
FIG. 3A illustrates example components capable of performing the operations shown in FIG. 3.
Figure 4A:
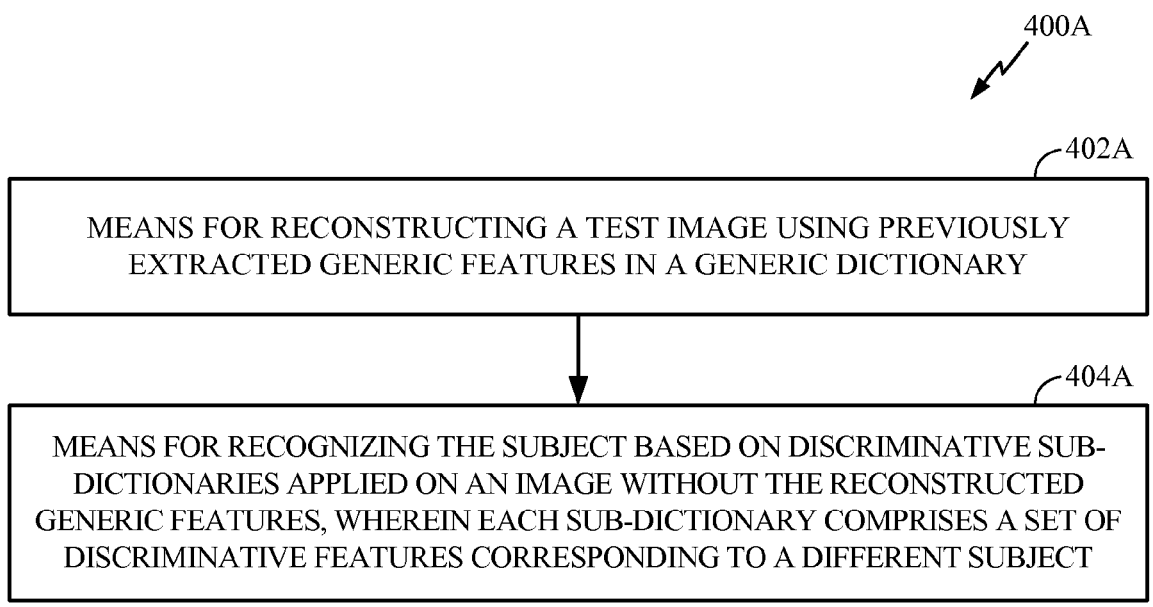
FIG. 4A illustrates example components capable of performing the operations shown in FIG. 4.

The various operations of methods described above may be performed by various hardware and/or software component(s) and/or module(s) corresponding to means-plus-function blocks illustrated in the Figures. For example, blocks 302-310 illustrated in FIG. 3 correspond to means-plus-function blocks 302A-310A illustrated in FIG. 3A. Similarly, blocks 402-404 illustrated in FIG. 4 correspond to means-plus-function blocks 402A-404A illustrated in FIG. 4A. More generally, where there are methods illustrated in Figures having corresponding counterpart means-plus-function Figures, the operation blocks correspond to means-plus-function blocks with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for signal processing, comprising:
obtaining a plurality of signals related to a plurality of subjects;
extracting, using at least one processor, one or more generic features of the subjects based on the signals;

training, based on the one or more generic features, a first dictionary used to recognize the subjects, wherein the first dictionary is applied in an initial level of reconstruction of the signals;
removing, using the at least one processor, the generic features from the plurality of signals to obtain one or more updated patterns for each subject;
obtaining a set of discriminative features for each subject based on the updated patterns; and
adding, based on the set of discriminative features, one or more second dictionaries used to recognize the subjects, wherein the one or more second dictionaries are applied at a level of reconstruction of the signals subsequent to the initial level.

2. The method of claim 1, further comprising:
determining, from a plurality dictionaries, a dictionary best suited for recognizing the plurality of subjects, wherein the plurality of dictionaries comprises the first dictionary and the one or more second dictionaries; and
recognizing the subject based on the determined dictionary.

3. The method of claim 1, further comprising:
training, based on the one or more generic features, another dictionary of the one or more second dictionaries used to recognize the subjects, wherein the other dictionary is applied at a level of reconstruction of the signals subsequent to the initial level but before a final level.

4. The method of claim 1, further comprising:
training, based on the obtained sets of discriminative features, another dictionary of the one or more second dictionaries comprising a plurality of sub-dictionaries, each sub-dictionary comprising one of the sets of discriminative features, and wherein the other dictionary is used to recognize the subjects at a final level of reconstruction of the signals.

5. An apparatus for signal processing, comprising:
means for obtaining a plurality of signals related to a plurality of subjects;
means for extracting one or more generic features of the subjects based on the signals;
means for training, based on the one or more generic features, a first dictionary to recognize the subjects, wherein the first dictionary is applied in an initial level of reconstruction of the signals;
means for removing the generic features from the plurality of signals to obtain one or more updated patterns for each subject;
means for obtaining a set of discriminative features for each subject based on the updated patterns; and
means for adding, based on the set of discriminative features, one or more second dictionaries used to recognize the subjects, wherein the one or more second dictionaries are applied at a level of reconstruction of the signals subsequent to the initial level.

6. The apparatus of claim 5, further comprising:
means for determining, from a plurality of dictionaries, a dictionary best suited for recognizing the plurality of subjects, wherein the plurality of dictionaries comprises the first dictionary and the one or more second dictionaries; and
means for recognizing the subject based on the determined dictionary.

7. The apparatus of claim 5, further comprising:
means for training, based on the one or more generic features, another dictionary of the one or more second dictionaries to recognize the subjects, wherein the other dictionary is applied at a level of reconstruction of the signals subsequent to the initial level but before a final level.

8. The apparatus of claim 5, further comprising:
means for training, based on the obtained sets of discriminative features, another dictionary of the one or more second dictionaries comprising a plurality of sub-dictionaries, each sub-dictionary comprising one of the sets of discriminative features, and wherein the other dictionary is used to recognize the subjects at a final level of reconstruction of the signals.

9. An apparatus for signal processing, comprising:
a circuit configured to obtain a plurality of signals related to a plurality of subjects;
at least one processor configured to:
extract one or more generic features of the subjects based on the signals;
train, based on the one or more generic features, a first dictionary used to recognize the subjects, wherein the first dictionary is applied in an initial level of reconstruction of the signals;
remove the generic features from the plurality of signals to obtain one or more updated patterns for each subject;
obtain a set of discriminative features for each subject based on the updated patterns;
add, based on the set of discriminative features, one or more second dictionaries used to recognize the subjects, wherein the one or more second dictionaries are applied at a level of reconstruction of the signals subsequent to the initial level; and
a memory coupled with the at least one processor.

10. The apparatus of claim 9, wherein the at least one processor is further configured to:
determine, from a plurality of dictionaries, a dictionary best suited for recognizing the plurality of subjects, wherein the plurality of dictionaries comprises the first dictionary and the one or more second dictionaries; and
recognize the subject based one the determined dictionary.

11. The apparatus of claim 9, wherein the at least one processor is further configured to:
train, based on the one or more generic features, another dictionary of the one or more second dictionaries used to recognize the subjects, wherein the other dictionary is applied at a level of reconstruction of the signals subsequent to the initial level but before a final level.

12. The apparatus of claim 9, wherein the at least one processor is further configured to:
train, based on the obtained sets of discriminative features, another dictionary of the one or more second dictionaries comprising a plurality of sub-dictionaries, each sub-dictionary comprising one of the sets of discriminative features, and wherein the other dictionary is used to recognize the subjects at a final level of reconstruction of the signals.

13. A computer-program product for signal processing comprising a non-transitory computer-readable storage medium having instructions stored thereon, the instructions executable by a processor for:
obtaining a plurality of signals related to a plurality of subjects;
extracting, using at least one processor, one or more generic features of the subjects based on the signals;
training, based on the one or more generic features, a first dictionary used to recognize the subjects, wherein the first dictionary is applied in an initial level of reconstruction of the signals;

removing, using the at least one processor, the generic features from the plurality of signals to obtain one or more updated patterns for each subject;
obtaining a set of discriminative features for each subject based on the updated patterns; and
adding, based on the set of discriminative features, one or more second dictionaries used to recognize the subjects, wherein the one or more second dictionaries are applied at a level of reconstruction of the signals subsequent to the initial level.

* * * * *